United States Patent [19]

Nakata et al.

[11] 4,408,114

[45] Oct. 4, 1983

[54] RESISTANCE WELDING WITH PRESSURE CONTROL IN RESPONSE TO DEVIATION BETWEEN WELDING VOLTAGE AND TIME VARYING REFERENCE VALUES THEREFOR

[75] Inventors: Shuji Nakata, 7-17 Hon-machi 5-chome, Toyonaka-shi, Osaka-fu, Japan; Masahiro Nishikawa, 394-3, Minamihanada-cho, Sakai-shi, Osaka-fu, Japan; Yoshio Kawaguchi, Yokohama, Japan

[73] Assignee: Nissan Motor Company, Limited, Kanagawa, Japan; by said Yoshio Kawaguchi

[21] Appl. No.: 336,955

[22] Filed: Jan. 4, 1982

Related U.S. Application Data

[63] Continuation of Ser. No. 177,363, Aug. 11, 1980, abandoned.

[51] Int. Cl.³ .............................................. B23K 11/24
[52] U.S. Cl. ................................ 219/110; 219/86.41; 219/117.1
[58] Field of Search ............ 219/110, 108, 109, 117.1, 219/86.22, 86.41, 86.51, 86.61

[56] References Cited

U.S. PATENT DOCUMENTS 3,068,350 12/1962 Archer .

3,654,424 4/1972 Vanderhelst ..................... 219/110
3,727,822 4/1973 Umbaugh ........................ 219/110

FOREIGN PATENT DOCUMENTS 1113767 9/1961 Fed. Rep. of Germany .
2346561 8/1975 Fed. Rep. of Germany .
590107 3/1976 U.S.S.R. .

OTHER PUBLICATIONS

"Soviet Inventions Illustrated", dated Jan. 24, 1979, pp. 26 and 27 of the section Metallurgy.

*Primary Examiner*—C. C. Shaw
*Attorney, Agent, or Firm*—Lowe, King, Price & Becker

[57] ABSTRACT

A system for resistance welding in which the welding voltage between the electrodes is controlled by changing the pressure applied to the electrodes or the firing phase angle of the welding current in accordance with a reference voltage curve or a reference voltage integration curve. The system comprises a voltage sensor, a reference voltage generator, a differential amplifier, and a pressure control device, or a calculating unit for determining an appropriate firing phase angle of the welding current. The system thus improved can ensure a stable, good welding quality, since the welding voltage is always controlled by a series of optimum welding voltages, during the welding process, in accordance with a reference voltage curve with respect to time, preferably in terms of cycles of the welding current.

22 Claims, 12 Drawing Figures

FIG. 12

RESISTANCE WELDING WITH PRESSURE CONTROL IN RESPONSE TO DEVIATION BETWEEN WELDING VOLTAGE AND TIME VARYING REFERENCE VALUES THEREFOR

This is a continuation of application Ser. No. 177,363 filed Aug. 11, 1980, now abandoned.

BACKGROUND OF THE INVENTION

1. Field of the Invention

The present invention relates generally to a control system for and method of resistance welding, and more specifically to an automatic welding voltage control system and method of such that the welding voltage between a pair of electrodes is controlled by changing the welding pressure or current applied to the electrodes in accordance with a reference voltage curve or a reference voltage integration curve.

2. Description of the Prior Art

In resistance welding, the welding quality is susceptible to change according to various welding conditions such as welding current, voltage, resistance, and the pressure between electrodes. Conventionally, therefore, there have been various testing systems for monitoring welding current, voltage, resistance, pressure, and so on between the two electrodes, and other systems for monitoring welded portions by using ultrasonic waves, for example, in order to check the quality of spot-welding. However, these monitoring methods or apparatus can only judge whether the quality of the welded portions is satisfactory after the welding process, and therefore cannot insure the quality of welding during the welding process.

With conventional resistance welding systems as described above, therefore, if the weld is poor in quality, it is necessary to correct or repair the welded portion, or to discard the parts or products in the worst case where the weld is beyond repair.

BRIEF DESCRIPTION OF THE INVENTION

With these problem in mind, therefore, it is the primary object of the present invention to provide a control system for resistance welding whereby a stable good weld can be obtained automatically because of the manner of control of welding voltage during the welding process, taking into consideration good adaptability to various welding conditions.

A number of experiments have indicated the following two results with regard to resistance welding:

(1) The welding voltage applied to two electrodes between which materials to be welded are pinched (including electrode tips in the case of spot welding) has a close relationship to the rise in temperature in the welded portion and to the diameter of the nugget formed; that is to say, the strength of the weld.

(2) A voltage curve with respect to welding time for obtaining a good weld can be selectively determined according to welding factors such as material, shape, thickness, etc.

Therefore, if the welding voltage between the electrodes is varied in accordance with a reference voltage curve, it is possible to produce a constant nugget diameter with constant strength and good weld quality.

In this case, as the reference curve, it is possible to consider the following two kinds of curves:

(1) A reference voltage curve with respect to welding time, either in real time or in cycles of the supplied current.

(2) A reference voltage integration curve with respect to welding time, especially when the supply voltage fluctuations are relatively large.

To achieve the above-mentioned objects and methods, the control system for resistance welding of the present invention comprises a voltage sensor, a reference voltage generator storing a reference curve, a differential amplifier for outputting a control signal according to the differential voltage between the voltage sensor and the reference generator and a pressure control device for controlling welding pressure or a calculating unit for outputting a firing phase angle control signal in response to the control signal, so that the welding voltage can be controlled in accordance with the reference voltage curve in order to obtain good weld quality.

BRIEF DESCRIPTION OF THE DRAWINGS

The features and advantages of the system for resistance welding according to the present invention will be more clearly appreciated from the following description taken in conjunction with the accompanying drawings in which like reference numerals designate corresponding elements, and in which.

DETAILED DESCRIPTION OF THE PREFERRED EMBODIMENTS

Usually, whenever two plates are spot-welded together by using a spot welding apparatus, the welding strength largely depends upon the voltage between the electrodes, and more particularly upon a function of voltage with respect to the welding time, commonly measured in terms of cycles of the current supplied.

Figure 1:
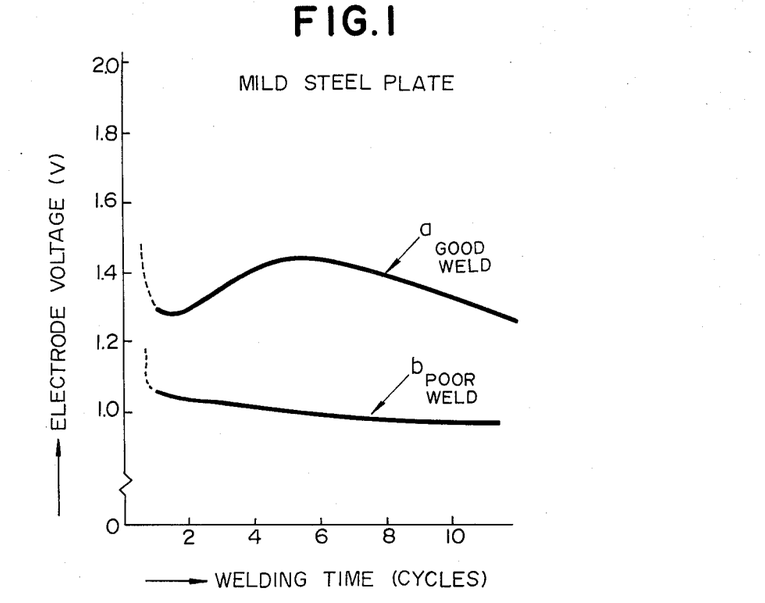
FIG. 1 is a graphical representation of exemplary relationships between electrode voltage and welding time for the case where two mild-steel plates are spot-welded.

In FIG. 1 are illustrated typical exemplary relationships between the voltage between the electrodes and welding time (hereinafter referred to simply as "a voltage curve") wherein two 1 mm thick mild-steel plates are spot-welded. In this figure, in the case of the voltage curve (a) the tensile strength is about 700 kg at the welded portion and therefore the weld quality is acceptable; however, in the case of the voltage curve (b) the tensile strength is about 60 kg and therefore the weld quality is not acceptable.

In addition, when regarded as a function between electrode voltage and time, in the case of the curve (a), wherein the voltage between the electrodes varies according to welding time, a strong nugget is formed, but however, in the case of the curve (b) wherein the voltage is substantially constant, almost no nugget is formed at the welded portion and therefore the weld quality is not acceptable.

Figure 2:
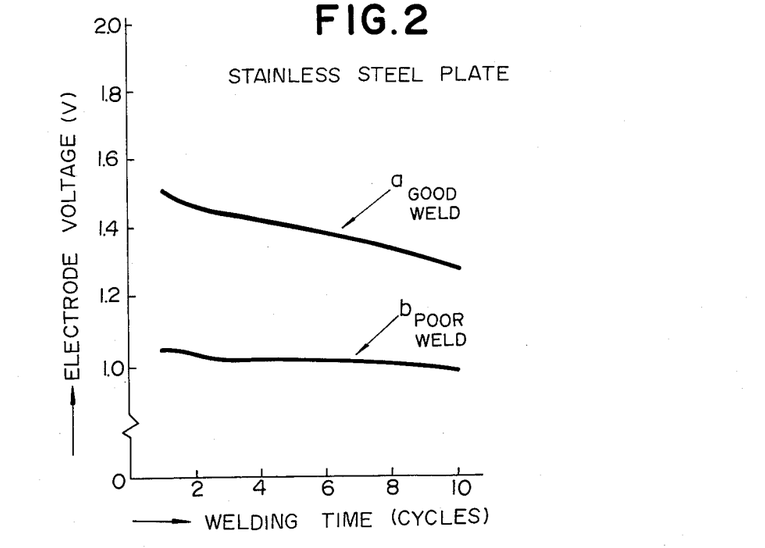
FIG. 2 is a graphical representation of exemplary relationships between electrode voltage and welding time for the case where two stainless-steel plates are spot-welded.

In FIG. 2 are illustrated typical exemplary relationships between the voltage between the electrodes and time wherein two 0.8 mm thick stainless-steel plates are spot-welded, similarly to FIG. 1.

As in FIG. 1, in the case of the curve (a) where voltage between the electrodes varies with time, a good quality is achieved at the welded portion with enough tensile strength, but, in the case of the curve (b) where the voltage does not vary appreciably, a poor quality is achieved with insufficient tensile strength.

As described above, since the welding quality is considerably affected by a function of electrode voltage with respect to time, it is possible to obtain a good stable weld quality for the welded portion, if the welding storage can be controlled so as to vary in accordance with a desired reference welding voltage curve as shown (b) in FIGS. 1 and 2. In this case, it is, of course, necessary to determine an optimum reference voltage curve after due consideration of various factors such as material, shape, and thickness.

The voltage between the electrodes can be controlled by the pressure applied to the electrodes, because the contact resistance therebetween varies sharply according to the pressure on the electrodes.

Figure 3:
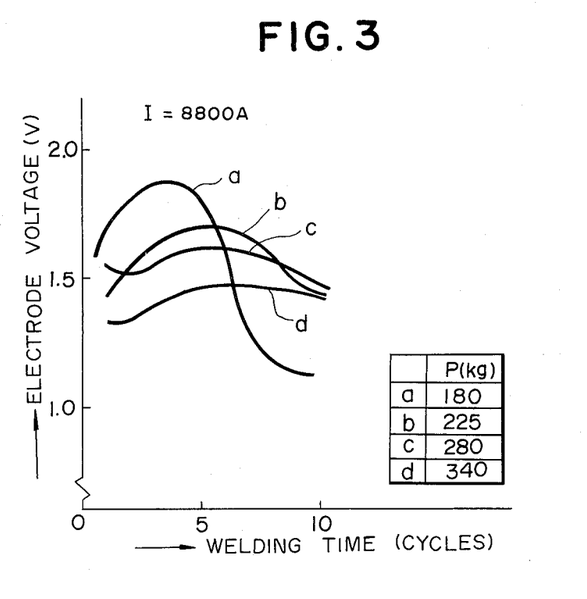
FIG. 3 is a graphical representation of relationships between electrode voltage and welding time where only the pressure applied to the electrodes is changed with the current held constant.

In FIG. 3 are illustrated variations in voltage between the electrodes when pressure on the electrodes is changed from 180 kg to 340 kg while a constant welding current of 8800 A is flowing.

As depicted by the curves (a) to (d) in the figure, the voltage between the electrodes decreases as a whole with increasing pressure on the electrodes. In this case, it has also been found that the nugget diameter decreases as the pressure on the electrodes increases. This is because the contact area formed between two plates and the thermal transmissibility between each electrode and each plate increases with increasing pressure applied to the electrodes.

Figure 4:
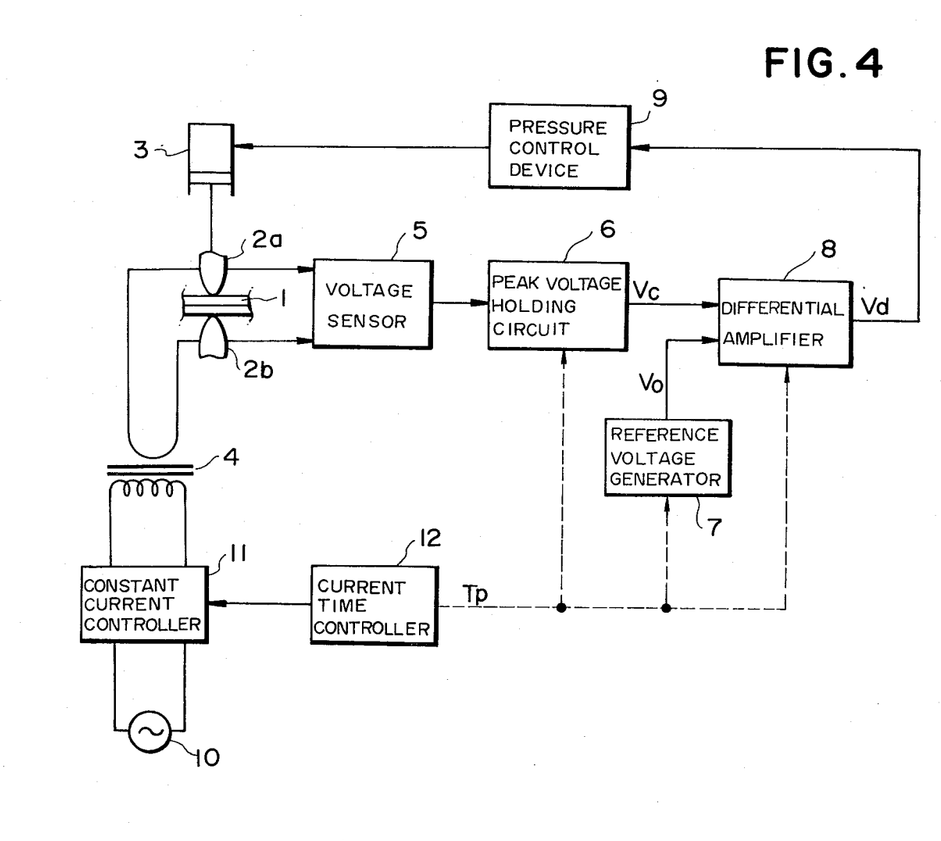
FIG. 4 is a schematic block diagram of the system of a first embodiment of the present invention.

Moreover, the reason why the voltage curve (a) in FIG. 3 (P=180 kg) drops sharply after the fourth cycle is that some flash is produced because of lack of pressure. Turning now to FIG. 4, a first preferred embodiment of the present invention is shown in the form of a block diagram.

In this figure, a pair of members or workpiece are welded by applying current through electrode 2a, moved by piston 3, and a fixed electrode 2b. A pressure is applied to the movable electrode 2a by the piston 3, during the welding process, with the members 1 pinched between the two electrodes through which a welding current flows from a transformer 4, whereby electrodes 2a and 2b apply a pressure to the workpiece. Voltage sensor 5 detects the instantaneous voltage between the electrodes 2a and 2b when the welding current is flowing therebetween (referred to simply as electrode voltage). Sensor 5 also rectifies the detected voltage. Peak voltage holding circuit 6 retains the peak voltage value of each detected half-wave cycle. Reference voltage generator 7 stores a previously determined reference voltage curve that is a function of electrode voltage with respect to time so as to obtain a desirable weld quality. Differential amplifier 8 compares the output voltage $V_c$ from the peak voltage holding circuit 6 with voltage $V_o$ derived from the reference voltage generator 7 to generate output signal $V_d$ corresponding to the difference between $V_o$ and $V_c$. Pressure control device 9 controls the pressure applied to the electrodes 2a and 2b, so that the differential voltage $V_d$ may be zero, by controlling the piston 3, as described in more detail below.

The system of FIG. 4 also includes AC power supply 11, constant current controller 11, and a current time controller to 12 that supplies start and stop signals to the constant current controller 11 in order to supply the welding current for the necessary time period. The current time controller 12 also derives a timing signal $T_p$, for synchronization with other units, after the current begins to flow, as indicated by way of the dashed lines shown in FIG. 4.

In this embodiment, while the welding current is flowing, the welding voltage is continuously detected by the voltage sensor 5; each half-wave peak value $V_c$ of the detected electrode voltage is derived from the peak voltage holding circuit 6; each peak value $V_c$ is next compared with the voltage $V_o$ based on a reference voltage curve generated from the reference voltage generator 7 by the differential amplifier 8. Then the pressure control device 9 controls the pressure on the electrodes 2a and 2b actuating the piston 3 in accordance with the signal $V_d$ in proportion to the voltage difference. In this case, the electrode voltage decreases with increasing pressure applied thereto, and increases with decreasing pressure. Since the electrode voltage is controlled within an allowable range in accordance with the above reference voltage curve while the current is flowing between the electrodes, it is possible to obtain a good quality nugget at all times.

In addition, although an abnormally large electrode voltage is sometimes detected due to an increase in contact resistance between a pair of welded plates immediately after the welding current begins to flow, this voltage does not affect the quality of the welded portion. Therefore, in order to prevent erroneous operation caused by this spruious voltage, it is desirable not to use the output signal from the differential amplifier 8 during the starting period. For this reason, immediately after the current starts flowing, the system is so designed that timing signal $T_p$ derived from the current time controller 12 can suppress the output from the differential amplifier 8 for several cycles, and the pressure control device 9 can be controlled so that the piston 3 applies a predetermined pressure to the electrodes 2a and 2b for this period only. If an electric hydraulic servo valve is used for this purpose, it is not difficult to control the pressure up to about 50 Hz with adequate frequency response characteristics.

Figure 5:
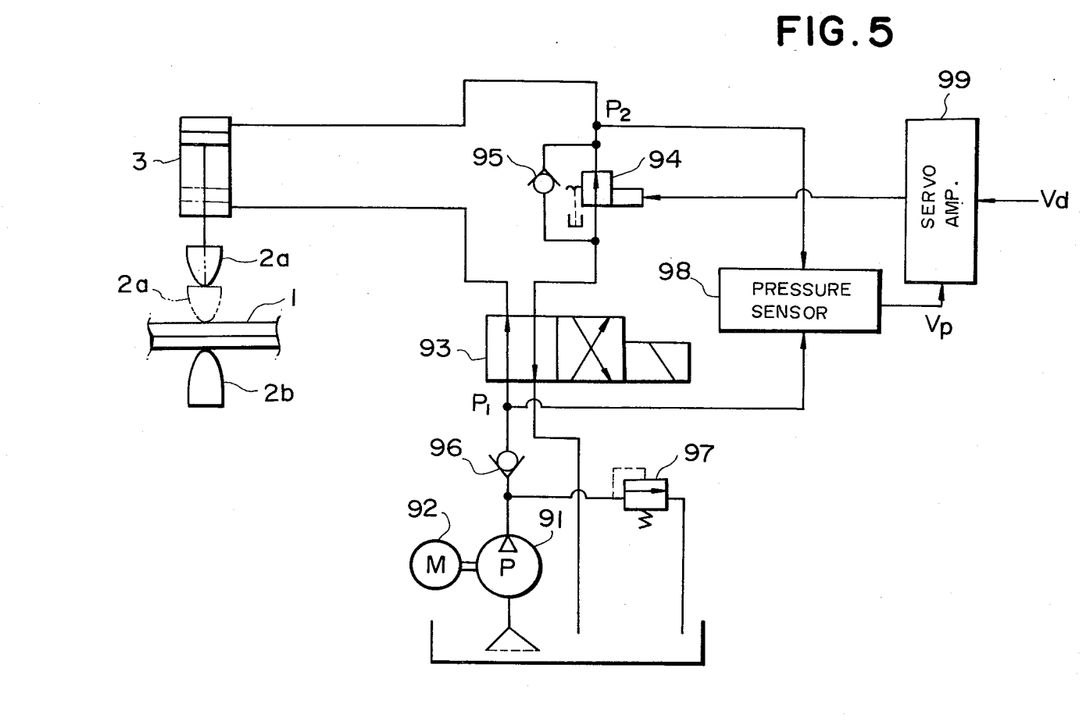
FIG. 5 is a schematic diagram of a pressure control device used with the present invention.

FIG. 5 is a schematic diagram of the pressure control device 9 used with the embodiments of the present invention.

In this figure, a hydraulic pump 91 driven by a motor 92. Device 9 also includes a direction changeover valve 93, a proportional pressure reduction valve 94 for adjusting the pressure, one-way valves 95 and 96, and relief valve 97. Pressure sensor 98 detects the pressure applied to the piston 3 in response to the pressure difference between the pressure gage ports $P_1$ and $P_2$. and Servo amplifier 99 amplifies a signal for controlling the proportional pressure reduction valve 94 in response to the signal $V_d$ from the differential amplifier 9 and feedbox signal $V_p$ from the pressure sensor 98.

These elements described above are connected to each other by using appropriate hydraulic pipes so as to form a hydraulic system.

In FIG. 5, if the direction change-over valve 93 is set so that fluid flows in the direction shown in the figure, fluid pressure is applied from the lower side of the cylinder chamber to the piston 3 to push up the movable electrode 2a; if, however, the valve 93 is switched to the reverse direction by the signal from a control panel (not shown), the pressure supplied by the hydraulic pump 91 is applied from the upper side of the cylinder chamber to the piston 3 through the proportional pressure reduction valve 94 to push down the movable electrode 2a, so that additional pressure is applied to the members 1 to be welded as shown by phantom lines in FIG. 5. In this case, the additional pressure is continuously decreased or increased in response to the signal $V_d$ from the differential amplifier 8 since the proportional pressure reduction valve 94 is also controlled by the servo amplifier 99 in response to the signal $V_d$, forming a closed loop control system with the signal $V_p$ as a feedback signal.

Figure 6:
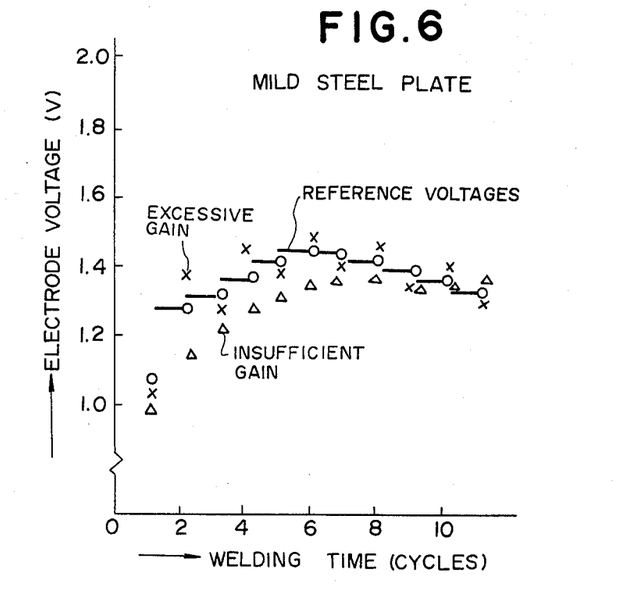
FIG. 6 is a graphical representation of relationship between electrode voltage and welding time wherein two mild-steel plates are spot-welded by using the system shown in FIG. 4, in which step-like reference voltages and half-wave peak values of electrode voltage are plotted.

In FIG. 6 is shown an example of the correspondence between a series of reference voltages based on a reference voltage curve (horizontal bars) and the half-wave peak values of detected electrode voltage (points shown by marks o, x and Δ) when two mild steel plates are spot-welded with the system of the first embodiment explained above.

Figure 7:
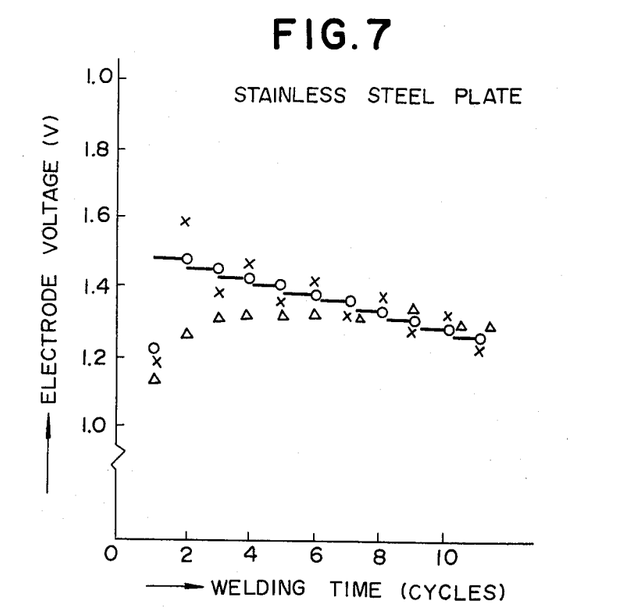
FIG. 7 is a graphical representation of a relationship between electrode voltage and welding time wherein two stainless-steel plates are spot-welded by using the system shown in FIG. 4, in which step-like reference voltages and half-wave peak values of electrode voltage are plotted.

In FIG. 7 is shown another example where two stainless steel plates are spot welded in the same way as in FIG. 6. The above figures indicate that it is possible to make the electrode voltage roughly correspond to the reference voltage curve for each cycle by selectively determining the control loop gain of the welding system, as shown by marks o. In these figures, the marks x show a case where the loop gain is excessive, and the marks Δ that where it is insufficient.

In the above embodiments, the voltage between the welding electrodes is controlled; it is possible alternatively to control the integral of electrode voltage, for even more stable quality, especially when the supply voltage fluctuates greatly.

Figure 8:
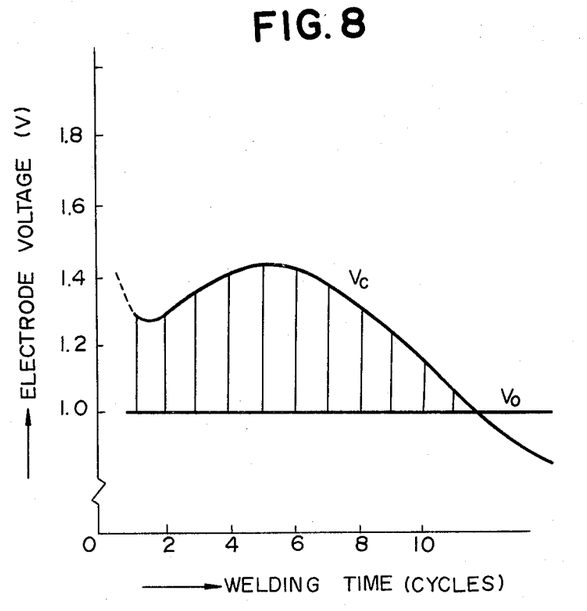
FIG. 8 is a graph used to explain how to obtain the integral of electrode voltage with respect to welding time, being the basis of a second embodiment of the present invention.
Figure 9:
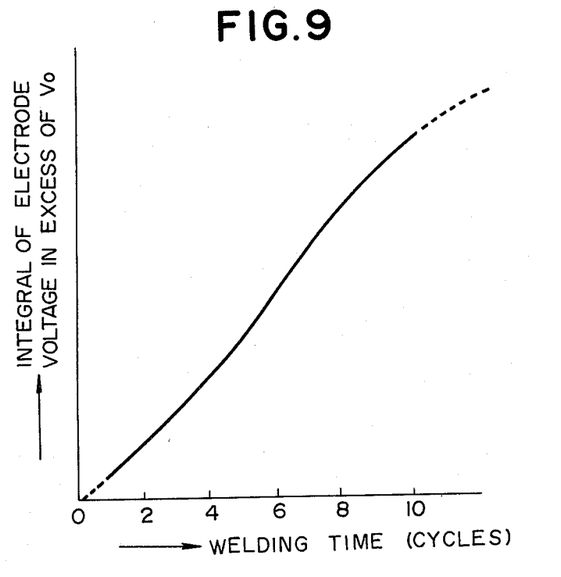
FIG. 9 is an example of a voltage integration curve of electrode voltage.

In FIG. 8 is shown how to obtain the above integral of the electrode voltage, and is helpful in describing the fundamental concept of the second embodiment.

Figure 10:
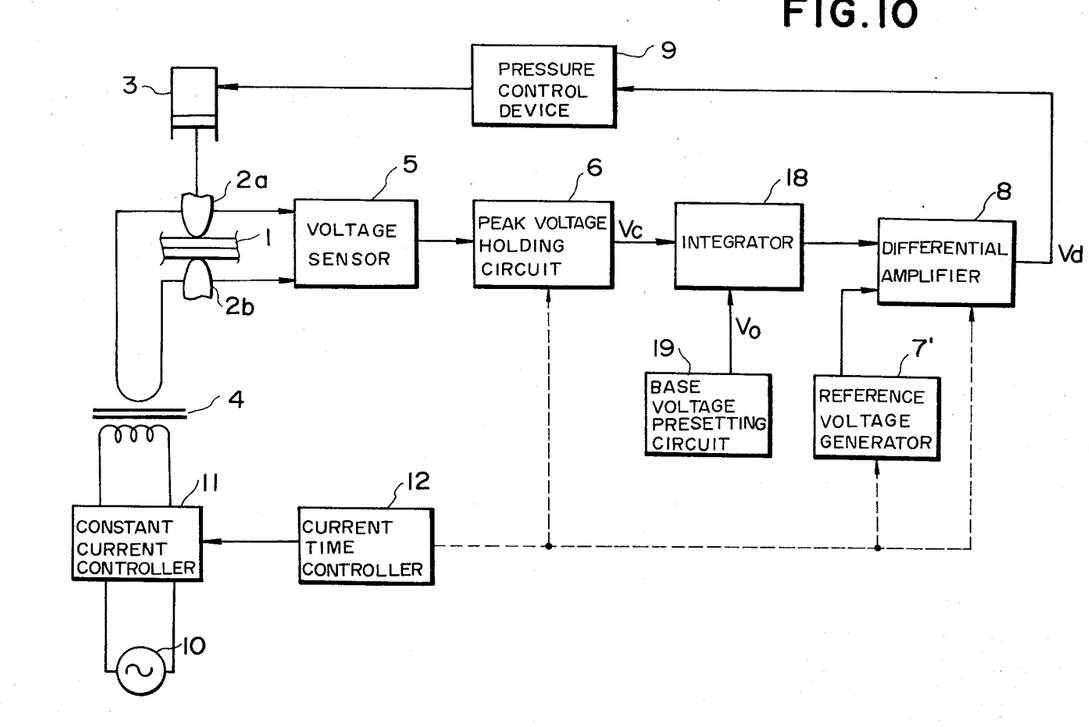
FIG. 10 is a schematic block diagram of the system of a second embodiment of the present invention.

As shown in this figure, the electrode voltage $V_c$ between the welding materials is detected while the welding current is flowing in the same way as in the above mentioned embodiment. The voltage difference $(V_c-V_o)$ is integrated with respect to the time while welding current is flowing only when the detected voltage $V_c$ exceeds a predetermined level voltage $V_o$. In FIG. 10 is shown an example of the voltage integration curve thus obtained.

The second embodiment of the present invention controls the electrode voltage in accordance with a voltage integration curve previously stored in an appropriate unit so as to obtain good welding quality.

FIG. 10 is a schematic block diagram of a second embodiment of the present invention.

Figure 11:
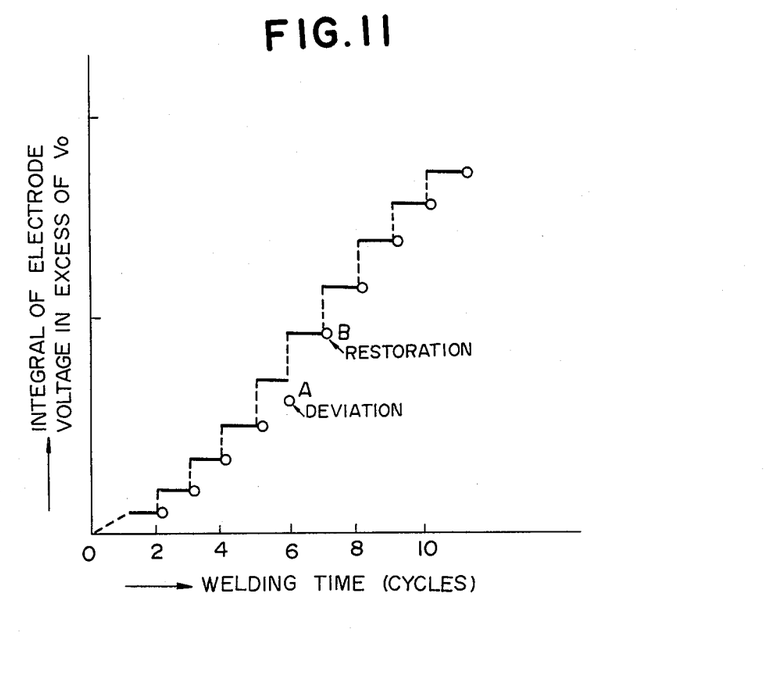
FIG. 11 is a diagram of assistance in explaining the operation of FIG. 10.

In addition to the aparatus of the embodiment shown in FIG. 4, there are further provided an integrator 18, and a base voltage presetting circuit 19. In addition, a reference voltage integration curve, as shown by solid bars in FIG. 11, is previously stored in the reference voltage generator 7' to derive a series of reference voltage integral values for each welding cycle.

In this embodiment, the integrator 18 integrates the voltage difference between $V_c$ and $V_o$ only when the half-wave peak value $V_c$ of the electrode voltage derived from the voltage peak-value holding circuit 6 exceeds the predetermined by the base voltage $V_o$ circuit 19. These integration values are shown by marks o in FIG. 11.

The integration value derived from the integrator 18 is compared with the reference voltage derived from the reference voltage generator 7' in the differential amplifier 8. Pressure controller 9 is actuated to control the pressure between the electrodes 2a and 2b, in the same way as in FIG. 4, in accordance with the signal $V_d$ corresponding to the difference. Therefore, even if the value of integral deviates, for example, to a value A shown by a mark o in FIG. 11, it is possible to correct the value to a value B so as to follow the reference voltage integration curve.

Figure 12:
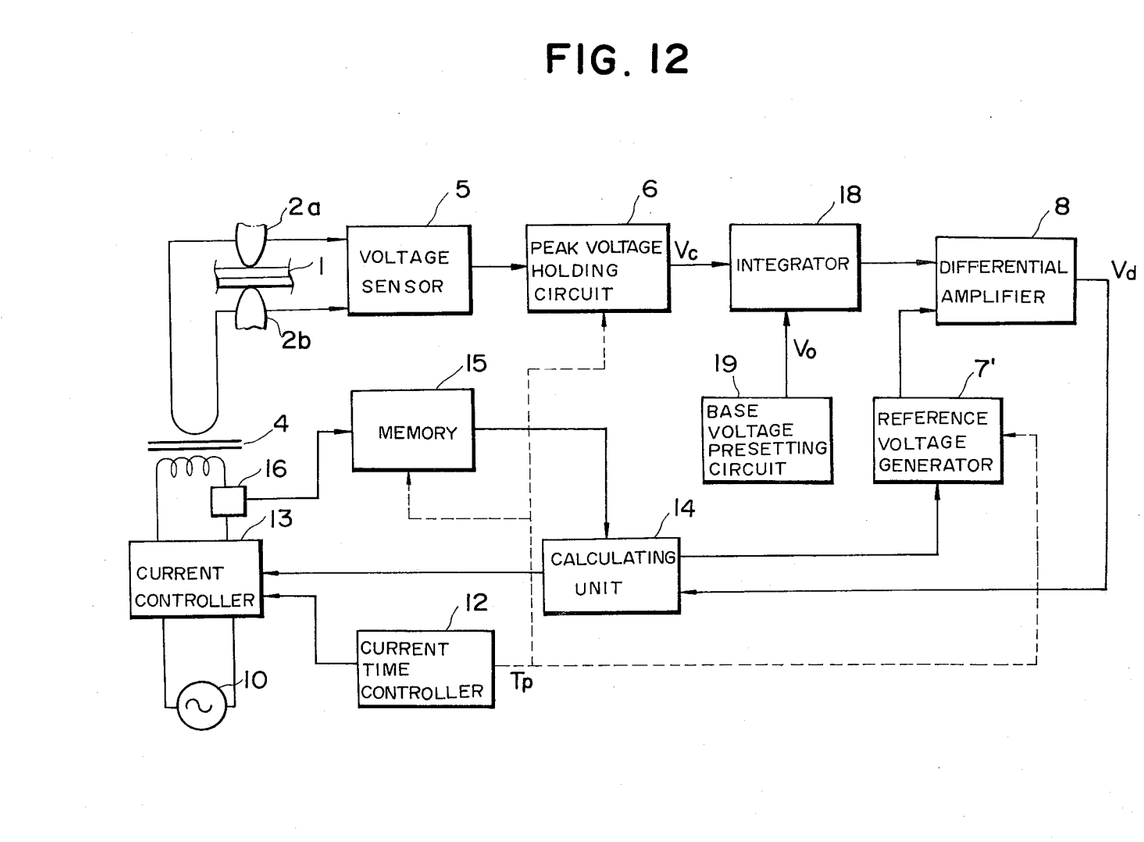
FIG. 12 is a schematic block diagram of the system of a third embodiment of the present invention.

In FIG. 12 is shown a schematic block diagram of the third embodiment of the present invention, in which the welding voltage is controlled by detecting the welding current instead of welding pressure.

In the figure, a current controller 13, including controlled rectifiers such as thyristors or triacs, for controls the welding current. The embodiment of FIG. 12 includes calculating unit 14, memory 15, and current sensor which includes 16, a current transformer.

In this case, since one- or two-cycle initial firing phase angles for the controlled rectifiers are previously stored in the memory 15, the initial welding current is controlled in accordance with these stored phase angles immediately after starting. After that, however, since the current time controller 12 supplies a start signal $T_p$ to the memory 15 and the peak voltage holding circuit 6, the memory 15 begins to store the firing phase angle of the preceding current waveform detected by the current sensor 16; the calculating unit 14 calculates an appropriate firing phase angle depending on an output signal $V_d$ from the differential amplifier 8. A signal from the memory 15 indicative of the calculated results, is supplied to the current controller 13, so that the welding voltage between the electrodes follows the reference voltage integration curve stored in the reference voltage generator 7'.

At the start, in this embodiment, the current controller 13 is controlled by the calculated signal stored in the memory 15, which signal dependent on the initial firing phase angles and is unresponsive to the output signal $V_d$ from the differential amplifier 8. Thereby it is possible to prevent erroneous operation caused by an abnormally large initial electrode voltage due to an increase in contact resistance between a pair of welded plates.

On the other hand, even if the temperature distribution is the same for materials to be welded, the electrode voltage changes as the firing phase angle of welding current changes. Therefore, it is necessary to correct the reference voltage generator 7' in accordance with the firing phase angle. For this reason, as shown in FIG. 12, the firing phase angle of welding current stored in the memory 15 is transferred to the reference voltage generator 7' through the calculating unit 14.

In the above embodiments, operations have been decribed in the case where alternating current is used with a sampling method by selecting the half-wave peak values as the representative points; however, it is also possible to use direct current in a continuous control method.

In addition, operation has been described in application to spot welding, but it is also possible to apply this invention to other resistance welding techniques such as projection welding, seam welding, flash welding, upset butt welding, etc., as is easily understood by those skilled in the art.

As described above, according to the system and the method of the present invention, since the welding pressure between the two electrodes between which members to be welded are pinched is controlled during the welding process so as to obtain a desired stable quality, it is possible to do away with the repair processes for welded parts, and to reduce markedly the ratio of defective products without wasting parts or products, with the result that welding productivity is remarkably improved.

Further, since the pressure control between the electrodes is especially effective to prevent surface flashes or burrs at the welded portion, it is possible to improve the safety and appearance of products.

Furthermore, since the integrated value of voltage difference between the electrodes which exceeds a base voltage can be controlled so as to follow a reference voltage integration curve (a curve necessary to obtain a stable good welding quality), it is possible to ensure a remarkably good welding quality even in cases where the supply voltage fluctuates considerably.

It will be understood by those skilled in the art that the foregoing description is in terms of preferred embodiments of the present invention wherein various changes and modifications may be made without departing from the spirit and scope of the invention, which is to be defined by the appended claims.

What is claimed is:

1. A welding control system comprising:
   (a) a constant current controller for holding at a constant value welding current flowing through a pair of welding electrodes between which members to be welded are pinched;
   (b) a voltage sensor for detecting a voltage $V_c$ between the pair of welding electrodes while the welding current is flowing:
   (c) a reference voltage generator for generating a series of predetermined different reference welding voltages $V_o$ based on a reference voltage vs. welding time curve;
   (d) means for comparing the voltage $V_c$ detected by said voltage sensor with the voltage $V_o$ based on the reference voltage curve and deriving a control signal having a magnitude indicative of the deviation between voltages $V_c$ and $V_o$;
   (e) a pressure control device for controlling the welding pressure applied to the two welding electrodes in accordance with the signal magnitude $V_d$ derived from said comparing means; and
   (f) a current-time controller for deriving a start-stop signal for controlling starting and stopping of said constant current controller and for deriving a timing signal $T_p$ for synchronizing said reference voltage generator and said comparing means;
   whereby the welding voltage between the electrodes is controlled by changing the pressure between the electrodes in accordance with the predetermined reference voltage curve so as to obtain a stable welding quality.

2. An AC welding control system comprising:
   (a) a constant AC current controller for holding at a constant value an AC welding current flowing through a pair of welding electrodes between which members to be welded are pinched;
   (b) a voltage sensor for detecting a voltage $V_c$ between the pair of welding electrodes while the welding current is flowing;
   (c) a peak voltage holding circuit for holding each half-wave AC peak value detected by said voltage sensor for a half cycle of the AC;
   (d) a base voltage presetting circuit for setting a previously determined desired constant base voltage $V_o$;
   (e) an integrator for integrating an indication of the difference between the voltage $V_c$ detected by said voltage sensor and the base voltage $V_o$ preset in said base voltage presetting circuit with respect to welding time only when each half-wave peak value of the detected voltage $V_c$ exceeds the base voltage $V_o$;
   (f) a reference voltage generator for generating a series of predetermined reference integral welding voltages based on a reference voltage integration curve with respect to welding time;
   (g) means for comparing the integrated difference indication with a value based on the reference voltage integration curve and for deriving a control signal having a magnitude $V_d$ indicative of the deviation between the integrated difference and the value;
   (h) a pressure control device for controlling the welding pressure applied to the two welding electrodes in accordance with the signal magnitude $V_d$ derived from said comparing means; and
   (i) a current-time controller for deriving a start-stop signal for controlling starting and stopping of said constant current controller and for deriving a timing signal $T_p$ for synchronizing said reference voltage generator and said comparing means and said voltage peak-value holding circuit,
   whereby the welding voltage between the electrodes is controlled by changing the pressure between the electrodes in accordance with the predetermined reference voltage integration curve so as to obtain a stable weld quality.

3. A control system for welding as set forth in claim 1 or 2, wherein one of said electrodes is movable and said pressure control device comprises:
   (a) a piston unit for applying welding pressure to the movable electrode;

(b) a proportional pressure reduction valve for adjusting the welding pressure applied to an upper chamber of said piston;

(c) a pressure sensor for determining the pressure applied to the piston unit in response to the pressure difference between upper and lower chambers of said piston unit and for deriving a feedback signal indicative of the detected pressure difference; and (d) a servo amplifier responsive to the signal derived from said comparing means and the feedback signal for deriving an error signal for controlling said proportional pressure reduction valve.

4. A welding control method comprising:

(a) supplying a constant AC welding current through a pair of welding electrodes and a workpiece;

(b) detecting a voltage $V_c$ between the pair of welding electrodes while the constant AC welding current is flowing between the welding electrodes and the workpiece;

(c) while the constant welding current is flowing generating a series of predetermined different reference welding voltages $V_o$ based on a reference voltage curve with respect to time measured cycles of the AC welding current;

(d) determining a magnitude indicative of the deviation between the detected voltage $V_c$ and the predetermined reference welding voltage $V_o$; and (e) while the constant AC welding current is flowing controlling welding pressure applied by the electrodes to the workpiece in accordance with the determined deviation magnitude whereby the welding voltage between the electrodes is controlled by changing the pressure between the electrodes in accordance with the predetermined reference voltage curve so as to obtain a stable weld quality.

5. A welding control method comprising:

(a) supplying a constant AC welding current through a pair of welding electrodes and a workpiece;

(b) detecting a voltage $V_c$ between the pair of welding electrodes while the constant AC welding current is flowing between the welding electrodes and the workpiece;

(c) storing an indication of each half-wave peak value of the detected voltage for each half cycle of the AC welding current;

(d) setting a derived constant base voltage value $V_o$ prior to the welding current being applied to the workpiece;

(e) integrating a magnitude commensurate with the voltage deviation between the detected voltage magnitude $V_c$ and the magnitude of the base voltage value $V_o$ only for each half-wave peak value of the detected voltage $V_c$ that exceeds the base voltage vlaue $V_o$;

(f) while the welding current is flowing generating a series of predetermined different reference welding voltage indications based on a reference voltage integration curve, the different reference welding voltage indications changing in value with respect to time measured in cycles of the welding current;

(g) while the welding current is flowing computing the deviation between the integrated value of the magnitude $V_c$ and the value of predetermined reference integration welding voltage indication; and (h) controlling welding pressure applied by the welding electrodes to the workpiece while the welding current is flowing in accordance with the computed deviation;

whereby the welding voltage between the electrodes is controlled by changing the pressure between the electrodes in accordance with the predetermined reference integration voltage curve so as to obtain a stable weld quality.

6. The welding control method as set forth in claim 4 or 5, wherein said step of controlling the welding pressure applied by the electrodes to the workpiece is performed by:

(a) detecting the pressure by a piston of a piston unit to an electrode, the detected pressure depending on the pressure difference between upper and lower chambers of the piston unit; and (b) proportionally changing the welding pressure applied to the upper chamber of the piston unit in response to an indication of the computed deviation and the detected pressure.

7. The method of claim 6 wherein the welding pressure is changed in response to a voltage indicative of the deviation, said welding pressure being changed in response to a voltage proportional to the deviation, said voltage being changed in accordance with an amplification ratio commensurate with the detected pressure.

8. A method of high pressure AC resistance welding with constant AC current wherein the voltage between a pair of welding electrodes applying the welding current to a workpiece desirably has a tendency to decrease after several cycles of the AC current have been applied to the workpiece, the voltage having a tendency to decrease in response to some flash being produced because of a decrease in pressure applied to the electrodes to the workpiece, comprising the steps of detecting the voltage between the welding electrodes during successive half cycles of the constant AC welding current, and controlling the pressure applied by the electrodes to the workpiece in a manner tending to decrease the magnitude of the deviation of each half cycle detected voltage relative to a reference curve that is a function of desired electrode voltage with respect to each half cycle of the welding current, the desired electrode voltage monotonically decreasing with respect to successive half cycles of the welding current after a few half cycles of the welding current flow so as to obtain a desired weld quality.

9. The method of claim 8 wherein the magnitude of the peak voltage between the electrodes is detected during each half cycle of the AC current.

10. The method of claim 8 or 9 further including suppressing said control of the pressure and applying a predetermined pressure to the workpiece by the electrodes immediately after the welding current starts flowing for several initial cycles of the AC welding current.

11. The method of claim 10 wherein the pressure is controlled by a feedback loop responsive to the magnitude of the deviation, and controlling the gain of the feedback loop in response to the magnitude of the pressure applied by the electrodes to the workpiece.

12. The method of claim 8 or 9 wherein the pressure is controlled by a feedback loop responsive to the magnitude of the deviation, and controlling the gain of the feedback loop in response to the magnitude of the pressure applied by the electrodes to the workpiece.

13. A method of high pressure AC resistance welding with constant AC welding current applied by a pair of electrodes to a workpiece, the voltage between the electrodes being a function of the pressure applied by the electrodes to the workpiece, comprising the steps of detecting the voltage between the welding electrodes during successive half cycles of the constant AC welding current for each half cycle in which the detected voltage exceeds a predetermined constant value, integrating an indication of the voltage of that half cycle, and controlling the pressure applied by the electrodes to the workpiece in a manner tending to decrease the magnitude of the derivation of the integrated voltage indication after each half cycle and relative to a reference curve that is a function of derived integrated electrode voltage with respect to each half cycle of the welding current, the desired integrated electrode voltage monotonically increasing with respect to successive half cycles of the welding current after a few half cycles of the welding current flow so as to obtain a desired weld quality.

14. The method of claim 13 wherein the magnitude of the peak voltage between electrodes is detected during each half cycle of the AC current.

15. The method of claim 13 or 14 further including suppressing said control of the pressure and applying a predetermined pressure to the working piece by the electrodes immediately after the welding current starts flowing for several initial cycles of the AC welding current.

16. The method of claim 15 wherein the pressure is controlled by a feedback loop responsive to the magnitude of the deviation, and controlling the gain of the feedback loop in response to the magnitude of the pressure applied by the electrodes to the workpiece.

17. The method of claim 13 or 14 wherein the pressure is controlled by a feedback loop responsive to the magnitude of the deviation, and controlling the gain of the feedback loop in response to the magnitude of the pressure applied by the electrodes to the workpiece.

18. A method of high pressure resistance welding by applying welding current through a pair of electrodes to a workpiece, the voltage between the electrodes being a function of the pressure applied by the electrodes to the workpiece, comprising the steps of detecting the voltage between the welding electrodes, controlling the pressure applied by the electrodes to the workpiece in a manner tending to decrease the magnitude of the deviation of the detected voltage relative to a reference curve that is a function of desired electrode voltage, providing a feedback loop for controlling the pressure in response to the magnitude of the deviation, and controlling the gain of the feedback loop in response to the magnitude of the pressure applied by the electrodes to the workpiece.

19. Apparatus for high pressure resistance welding, comprising means for applying welding current to a workpiece through a pair of electrodes, the voltage between the electrodes being a function of the pressure applied by the electrodes to the workpiece, means for detecting the voltage between the welding electrodes, means for controlling the pressure applied by the electrodes to the workpiece in a manner tending to decrease the magnitude of the deviation of the detected voltage relative to a reference curve that is a function of desired electrode voltage, a feedback loop for controlling the pressure in response to the magnitude of the deviation, and means for controlling the gain of the feedback loop in response to the magnitude of the pressure applied by the electrodes to the workpiece.

20. A method of high pressure resistance welding with constant amplitude welding current impulses applied by a pair of electrodes to a workpiece, the voltage between the electrodes being a function of the pressure applied by the electrodes to the workpiece, comprising the steps of detecting the voltage between the welding electrodes during successive impulses of the welding current, and controlling the pressure applied by the electrodes to the workpiece in a manner tending to decrease the magnitude of the deviation of each detected voltage during each impulse relative to a reference curve that is a function of desired electrode voltage with respect to each impulse of the welding current, the desired electrode voltage function changing with respect to successive impulses of the welding current so as to obtain a desired weld quality.

21. The method of claim 20 wherein the pressure is controlled so it is susceptible to change after each welding current impulse.

22. The method of claim 20 wherein the detected voltage is the peak voltage value of each current impulse.

* * * * *